April 24, 1934.   W. F. OLIVER   1,955,930
HOSE END COUPLING AND METHOD OF ASSEMBLING
Filed Aug. 7, 1930
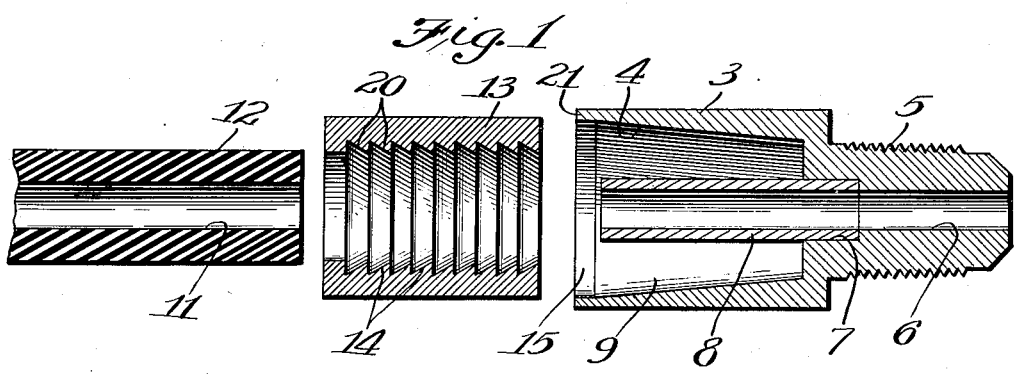
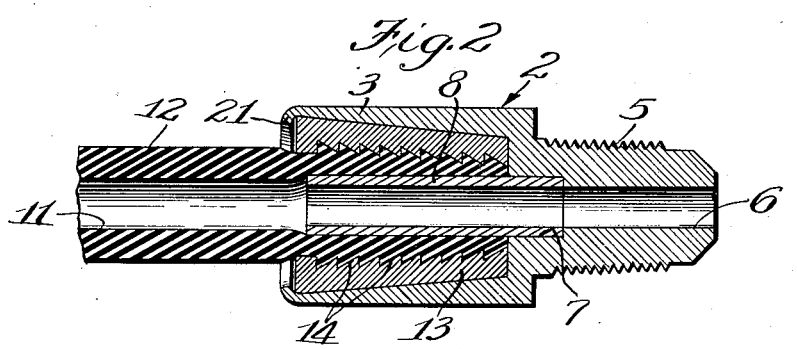
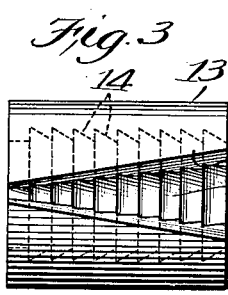
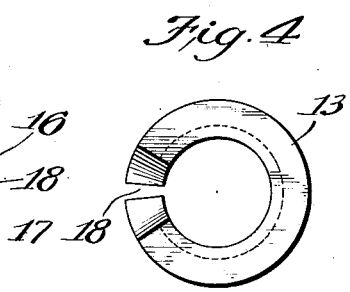
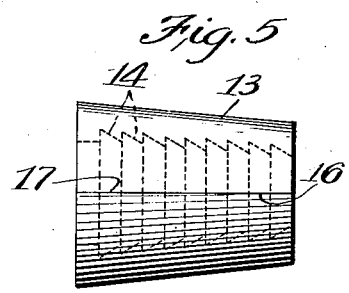
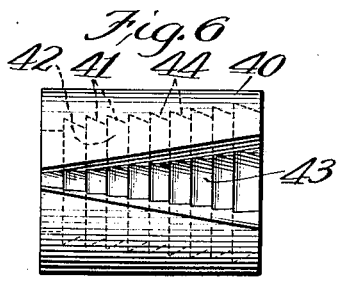
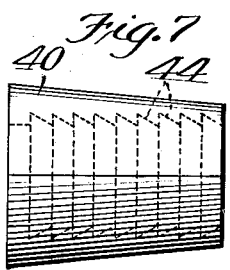
Inventor:
Wallace F. Oliver
By Williams, Bradbury, McColl
& Hinkle
Attys Patented Apr. 24, 1934

1,955,930

UNITED STATES PATENT OFFICE 1,955,930

HOSE END COUPLING AND METHOD OF ASSEMBLING

Wallace F. Oliver, Detroit, Mich., assignor to Hydraulic Brake Company, Detroit, Mich., a corporation of California Application August 7, 1930, Serial No. 473,548

3 Claims. (Cl. 285—84)

This invention relates to hose couplings and particularly to the construction and the method of attaching a coupling to a hose.

Flexible hose is universally used in hydraulic brake systems to interconnect the relatively movable parts and comprises a rubber tube having layers of stranded material interposed therein which renders the hose substantially non-expansible which is most essential.

The fluid pressure developed in a hydraulic braking system and especially when a sudden stop is necessary rises to a high degree and this necessitates the provision of a strong and durable coupler for connecting the hose to the metallic parts of the system and one of the objects of my invention is to provide an improved hose coupling used in connections of the above type.

Another object of my invention is the provision of a coupling that is not subject to separation from the hose when excessive pressure forces are applied.

A further object is to provide a hose coupling which is not subject to leakage under high pressure.

A further object of my invention is to provide a simple and inexpensively constructed member forming a part of the coupling to provide a positive interlocking connection between the hose, when positioned in the coupling body.

A still further object of my invention is the provision of an improved hose coupling consisting of few parts which are easily assembled to provide a coupling which is adapted for high pressure duty.

The above objects as well as others not particularly pointed out will appear in the following description taken in connection with the accompanying drawing in which the reference characters in the several views denote like parts and in which Fig. 1 is a longitudinal sectional view of the hose coupling with parts separated;

Fig. 2 is a longitudinal sectional view showing the parts at the completion of the assembly operation;

Fig. 3 is a side view in elevation of the clamping bushing which forms a part of the coupling member;

Fig. 4 is an end view of Fig. 3;

Fig. 5 is a view similar to Fig. 3 but showing the clamping bushing in clamping position;

Fig. 6 is a side view in elevation of a modified form of clamping bushing; and

Fig. 7 is a view similar to Fig. 6 but showing the clamping bushing in clamping position.

Referring to the drawing, the coupling member of my invention generally indicated by the reference character 2 comprises a cylindrical body portion 3 having a conical internal wall 4 gradually inclined to the axis of the coupling 2. The coupling 2 has a reduced portion 5 which is threaded for connecting the coupling to a companion part of the motor vehicle or the like such as the brake cylinder of the wheels or the metal tubing leading from the master cylinder of the system. The portion 5 of the coupling is provided with an internal bore 6 which is provided with a counter-bored portion 7 adapted to receive a cylindrical nipple 8 by means of a drive fit and which extends forwardly into the tapered bore 9 formed by the conical internal wall 4. While I have shown the nipple 8 as a separate part it is to be understood that this forwardly projecting nipple 8 can be made an integral portion of the coupling 2. The nipple 8 is adapted to enter the internal bore 11 of the hose 12.

The clamping bushing 13 clearly illustrated in Figs. 3, 4 and 5, is constructed of ribbon stock of suitable width and thickness which is cut in suitable lengths and formed into split clamping bushings 13. The flat ribbon stock, such as sheet brass or the like from which the clamping bushings are made, is first fabricated by means of a suitable operation such as rolling, to produce a plurality of parallel saw tooth shaped serrations 14 in one face of the same. The fabricated ribbon stock is then cut into suitable lengths and formed into cylindrical split bushings 13 with the serrated surface forming the inner wall to present a plurality of annular saw-toothed serrations or teeth 14. The bushing 13 is of the same diameter throughout its length and is of a size to be received in the open end 15 of the tapered bore 9 in body 3. The adjacent edges 16 and 17 of the split bushing 13 are oppositely inclined to provide a wedge or V-shaped gap 18 which, when the clamping bushing 13 is forced into the tapered bore 9, permits the respective edges to abut to form a tapered bushing and cause the teeth 14 to grip the outer wall of the hose 12.

In assembling, the hose 12 is manually inserted into the bushing 13 and as the internal diameter of the bushing at the apexes of the teeth 14 is slightly less than that of the hose 12, the portion of the hose within the bushing is slightly compressed. The teeth 14 slant in a direction so as to permit the ready insertion of the hose 12 in the bushing 13. The bushing 13, thus supported on the hose end, is now inserted into the open end 15 of the tapered bore 9, permitting the end of the nipple 8 to enter the internal bore of the hose 12. Pressure is now applied to the bushing 13 by a suitable press head or the like to force the same into the conical bore 9 against the progressively decreasing diameter of the bore 9 and the wedge or V-shaped gap 18 permits the bushing 13 to contract diametrically and assume a tapered form causing the annular ridges or teeth 14 to be forced inwardly into engagement with the wall of the hose 12. The hose wall thus enters the interdental spaces 20 between the respective teeth 14, thereby securing a positive grip upon the hose 12. As the bushing 13 is forced into the tapered bore 9 the nipple 8 is also forced into the hose 12 and serves as a reenforcement to prevent the collapse of the hose 12 due to the compression of the same as the bushing is forced into place. The annular end 21 of the coupling 3 after the bushing 13 is forced into place is crimped or spun over and prevents the bushing 13 from pulling out. The hose entering the interdental spaces 20 in the bushing 13 provides a positive grip upon the hose 12 and the crimped end 21 in turn prevents displacement of the bushing from the bore 9.

The clamping bushing so illustrated in Figs. 6 and 7 is of the same shape and size as the bushing 13 just described and may also be constructed of ribbon stock. The ribbon stock for constructing the bushing 40 is, however, of the extruded type in which one face is angularly disposed to form a sheet which progressively increases in thickness toward its one edge. This extruded ribbon stock is also fabricated by means of a suitable operation to produce a plurality of parallel saw-toothed serrations 41 on the angular face of the same. The stock is then cut into predetermined lengths and formed into cylindrical split bushings 40 with the angularly faced serrated surface forming the inner wall to present a plurality of annular saw-toothed ridges or teeth 41. The progressively increasing thickness toward one edge as just described provides the formed split bushing 40 with a tapered bore 42, the inclination of which is opposite that of the tapered bore 9 in the coupling 3 when the same is initially positioned in the open end 15 of the bore 9. Suitable pressure is applied to the bushing 40 in a manner previously described to force the same into the bore and the wedge-shaped gap 43 as the bushing 40 is forced down against the progressively decreasing diameter of the bore 9 permits the bushing 40 to assume a tapered form. The tapered bore 42 of the bushing 40 which is initially inclined at an angle opposite that of the tapered bore 9 now assumes a substantially straight bore of decreased diameter causing the hose wall to enter the interdental spaces 44 between the respective teeth 41 securing a positive grip upon the hose 12.

The bushing 40 as described is formed of extruded ribbon stock but it is apparent that flat ribbon stock may be used and extruded simultaneously with the serrating operation.

A great advantage of my invention lies in the fact that the reduced portion 5 may be provided with S. A. E. standard thread which may be screwed directly into the wheel cylinders. The flexible hose now used in hydraulic brake systems is provided with coupling threads of such large diameter that it is necessary to interpose a reducing bushing between the ends of the flexible hose and the wheel cylinders. With my new and improved coupling it is possible to eliminate this bushing entirely and to thread the hose directly into the wheel cylinders.

While I have illustrated and described the coupling of my invention as used in connection with a brake system, it is to be understood that the coupling is applicable for other uses. Changes and modifications may suggest themselves and I therefore aim to cover all such changes and modifications as come within the spirit and scope of the appended claims.

I claim:

1. A cylindrical bushing having a uniform outside diameter, an inner surface formed by a series of annular teeth of progressively increasing diameter, and a tapered longitudinal slot.

2. A coupling member for attachment to a hose comprising a sleeve, a bushing for receiving the end of the hose and having a uniform outside diameter, an inner surface formed by a series of annular teeth of progressively increasing diameter, and a tapering longitudinal slot therein, a tapered bore in the sleeve for the reception of said bushing, a nipple extending into the bore of the hose, and means on said sleeve for securing said bushing in said bore, said bushing being adapted to be diametrically contracted upon insertion into the tapered bore of said sleeve for securely clamping the hose end between said bushing and said nipple.

3. A coupling member for attachment to a hose, comprising a sleeve having a uniformly tapered bore therein, a cylindrical nipple extending forwardly in said bore, an initially externally cylindrical bushing for receiving said hose and adapted to be forced into said bore and to be progressively contracted about said hose by the tapered wall of the bore thereby to clamp the said hose between the bushing and the nipple extending into the bore of the hose.

WALLACE F. OLIVER.